(12) United States Patent
Su

(10) Patent No.: US 11,285,886 B2
(45) Date of Patent: Mar. 29, 2022

(54) VEHICLE-MOUNTED MOBILE PHONE HOLDER

(71) Applicant: Shenzhen Lizi Technology Co., LTD., Shenzhen (CN)

(72) Inventor: Chunfa Su, Shenzhen (CN)

(73) Assignee: SHENZHEN LIZI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/008,510

(22) Filed: Aug. 31, 2020

(65) Prior Publication Data

US 2021/0309160 A1    Oct. 7, 2021

(30) Foreign Application Priority Data

Apr. 6, 2020   (CN) .......................... 202020488761.7

(51) Int. Cl.
*B60R 11/00*    (2006.01)
*B60R 11/02*    (2006.01)
*H04M 1/04*    (2006.01)

(52) U.S. Cl.
CPC ........... *B60R 11/0241* (2013.01); *H04M 1/04* (2013.01); *B60R 2011/0059* (2013.01); *B60R 2011/0071* (2013.01)

(58) Field of Classification Search
CPC ........... Y10S 224/93; B60R 2011/0071; B60R 11/0241; B60R 7/08; B60R 11/00; B60R 7/06; B60R 2011/0059; H04M 1/04; H04M 1/06
USPC .................................................. 224/483, 930
See application file for complete search history.

(56) References Cited

U.S. PATENT DOCUMENTS

| 5,788,202 A | * | 8/1998 | Richter | ............... B60R 11/0241 248/316.4 |
| 7,185,796 B2 | * | 3/2007 | Parsons | ..................... A45F 5/02 224/197 |
| 7,537,190 B2 | * | 5/2009 | Fan | ......................... B60R 11/02 248/309.1 |
| 8,638,557 B2 | * | 1/2014 | Tsai | ....................... H04M 1/04 361/679.56 |
| 9,698,851 B2 | * | 7/2017 | Andrus | ............... B60R 11/0241 |
| 9,797,543 B2 | * | 10/2017 | Lin | ..................... E05B 73/0082 |
| 2004/0179678 A1 | * | 9/2004 | Hsu Li | ................ B60R 11/0247 379/441 |
| 2014/0263931 A1 | * | 9/2014 | Chen | ..................... F16M 13/00 248/576 |
| 2016/0261137 A1 | * | 9/2016 | Riehl | ..................... H02J 7/025 |

* cited by examiner

*Primary Examiner* — Adam J Waggenspack
(74) *Attorney, Agent, or Firm* — Andrew C. Cheng

(57) ABSTRACT

The present invention relates to a vehicle-mounted mobile phone holder. The vehicle-mounted mobile phone holder comprises a housing, a gear transmission assembly connected to the housing, at least two clamping devices and a control element which are connected to the gear transmission assembly; the gear transmission assembly comprises at least one inner lower element connected to the interior of the housing in a sliding manner, and an intermediate gear connected to the inner lower component in a linkage manner; the control element is pressed to drive the intermediate gear to rotate, and the inner lower element drives the clamping devices to move. The vehicle-mounted mobile phone holder according to the present invention has the advantages of high convenience for withdrawing and placing the mobile phone and an excellent clamping effect.

13 Claims, 12 Drawing Sheets

VEHICLE-MOUNTED MOBILE PHONE HOLDER

TECHNICAL FIELD

The present invention relates to the technical field of electronic product fittings, and in particular, to a vehicle-mounted mobile phone holder.

BACKGROUND

Existing mobile phone holders are widely used and more and more types of mobile phone holders are available. However, when the current mobile phone holder clamps a mobile phone, its clamping jaws will cause friction and extrusion to two sides of the mobile phone, which will damage the mobile phone. In addition, a clamping force cannot be adjusted randomly according to the size of the mobile phone, and thus the existing mobile phone holder cannot be used flexibly and it is inconvenient to withdraw and place the mobile phone.

SUMMARY

The technical problem to be solved by the present invention is to provide a vehicle-mounted mobile phone holder which can effectively overcome the defects in the prior art, can be applied to mobile phones of different sizes and thus has a wider application range.

In order to solve the above technical problems, the present invention provides the technical solution as follows. There is provided a vehicle-mounted mobile phone holder configured to clamp and fix an electronic device. The vehicle-mounted mobile phone holder has a housing, a gear transmission assembly connected to the housing, and at least two clamping devices and a control element which are connected to the gear transmission assembly, wherein the clamping devices cooperate with the housing to clamp a mobile phone; the gear transmission assembly has at least one inner lower element connected to the interior of the housing in a sliding manner, and an intermediate gear connected to the inner lower element in a linkage manner; the at least one inner lower element is connected to one of the clamping devices; and the control element is pressed to drive the intermediate gear to rotate, so that the inner lower element drives the clamping devices to move close to or away from each other.

Compared with the prior art, the vehicle-mounted mobile phone holder according to the present invention has the following benefits.

The clamping devices cooperate with the housing to clamp the mobile phone; the gear transmission assembly has the at least one inner lower element connected to the interior of the housing in a sliding manner, and the intermediate gear connected to the inner lower element in a linkage manner; the at least one inner lower element is connected to one of the clamping devices; and the control element is pressed to drive the intermediate gear to rotate, so that the inner lower element drives the clamping devices to move close to or away from each other. A distance between the clamping devices can be adjusted by driving the intermediate gear. Thus, it is convenient to place the mobile phone in a clamping chamber for fixing and also convenient for a user to use in driving. There is no need to dispose a bearing structure, which is similar to a gravity holder, for bearing the mobile phone in a third direction, so that it is more convenient to clamp an electronic device. The two inner lower elements are disposed oppositely and are meshed with the intermediate gear, so that the intermediate gear acts as a transmission element and a limiting element and can well adjust and control the relative movement of the inner lower elements. Thus, the distance between the two clamping devices can be well adjusted and controlled.

REFERENCE SIGNS IN FIGURES

Figure 1:
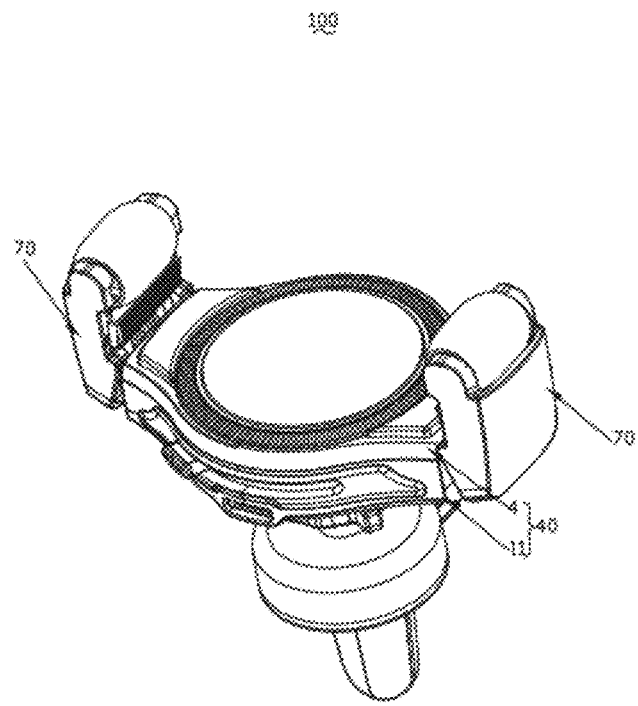
FIG. 1 is a perspective structural diagram of a vehicle-mounted mobile phone holder according to a first embodiment of the present invention.

100: vehicle-mounted mobile phone holder; 40: housing; 4: front housing; 41: positioning protrusion; 42: connection element; 411: arcuate shifting groove; 9111: pressing end; 9112: connection end; 9113: first positioning tooth; 10: arm cover; 11: rear housing; 9: gear shifting lever; 12: first roller; 112: lamp key; 113: connection portion; 13: connection arm frame; 131: connection groove; 114: hidden spring; 115: torsion spring; 116: pin; 117: hinge structure; 20: gear transmission assembly; 30: fixing element; 301: fixing portion; 302: clamping arm; 3021: first clamping arm; 3022: second clamping arm; 303: button; 304: rotary connection element; 44: second positioning tooth; 45: gear groove; 16: inner lower element; 53: shaft-fixing groove; 54: gear transmission chamber; 55: gear rack; 56: sliding portion; 5: intermediate gear; 61: shank; 70: clamping device; 71: anti-slip element; 72: anti-slip gasket; 81: charging coil; 82: charging mainboard; 83: charging interface; 90: anti-slip groove;

200: vehicle-mounted mobile phone holder; 201: housing; first housing; 2012: second housing; 2013: vibration-damping element; 202: gear transmission assembly; 203: clamping device; 204: control element; 205: inner tower element; 206: intermediate gear; 207: transmission gear; 208: rotation element; 209: key; 210: sliding rack; 211: intermediate element; 212: engagement element; 213: resisting element; 214: support; 215: sliding element; 216: pressing element; 217: connection shaft; 218: return spring; 219: counterforce spring; 220: limiting groove; 222: limiting element; 224: fixing element; 225: connection portion; 2251: second connection gear; 2252: fixing pillar; 226: universal ball; 2261: first connection gear; 2262. fixing core; 227: connection block; 228: clamping element; 229: clamping arm; 2291: locking element; 2292: placement element; 2293: connection hole; 230: limiting block; 2301: first limiting element; 2302: second limiting element; 231: first clamping arm; 2311: groove; 232:

second clamping arm; 233: clamping opening; 234: rotation element; 2341: clamping arm elastomer; 235: limiting shah; 236: fastening element; 2361: tightening element; 2362: connection spring; 237: locking portion;

300: vehicle-mounted mobile phone holder; 310: housing; 320: fixing element; 330: connection portion; 331: second connection gear; 340: universal ball; 341: first connection gear; 350: connection seat; 351: third connection gear; 360: fixing seat; and 361: fourth connection gear.

DETAILED DESCRIPTION

In order to make the objects, technical solutions and advantages of the present invention clearer, the present invention is further described in detail below with reference to the accompanying drawings and embodiments. It should be understood that the specific embodiments described herein are only intended to explain the present invention instead of limiting the present invention.

It should be noted that when an element is referred to as being "fixed to" another element, the element may be directly disposed on another element or there may be an intermediate element. When an element is regarded as being "connected to" another element, the element may be directly connected to another element or there may be an intermediate element. The terms "perpendicular", "horizontal", "left", "right" and similar expressions used herein are merely for the purpose of illustration.

Figure 2:
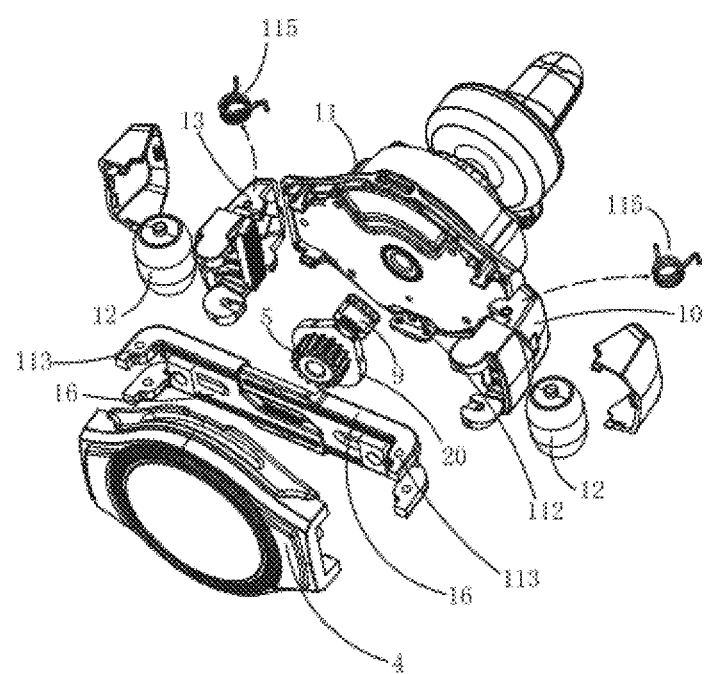
FIG. 2 is an exploded structural diagram of the vehicle-mounted mobile phone holder according to the first embodiment of the present invention.

With reference to FIGS. 1 and 2, a first embodiment of the present invention provides a vehicle-mounted mobile phone holder 100 which includes a housing 40, a gear transmission assembly 20 connected to the housing 40, and at least two clamping devices 70 and a control element 9 which are connected to the gear transmission assembly 20. The clamping devices 70 cooperate with the housing 40 to clamp a mobile phone. The gear transmission assembly 20 includes at least one inner lower element 16 connected to the interior of the housing 40 in a sliding manner, and an intermediate gear 5 connected to the inner lower element 16 in a linkage manner. The at least one inner lower element 16 is connected to one of the clamping devices 70. The control element 9 is pressed to drive the intermediate gear 5 to rotate, so that the inner lower elements 16 drive the clamping devices 70 to move close to or away from each other.

A clamping chamber for clamping the mobile phone is formed between the clamping devices 70 and the size of the clamping chamber is adjusted by adjusting the gear transmission assembly 20. The housing 40 includes a front housing 4 and a rear housing 11. The front housing 4 and the rear housing 11 are assembled together to form a space for accommodating the gear transmission assembly 20. Part of the gear transmission assembly 20 is accommodated in the space formed by the front housing 4 and the rear housing 11, and part of the gear transmission assembly 20 protrudes from the outer surface of the housing 40 and is connected to the clamping devices 70. When the mobile phone is placed in the clamping chamber, the front housing 4 supports the mobile phone and the clamping devices 70 clamp the mobile phone for positioning.

Figure 3:
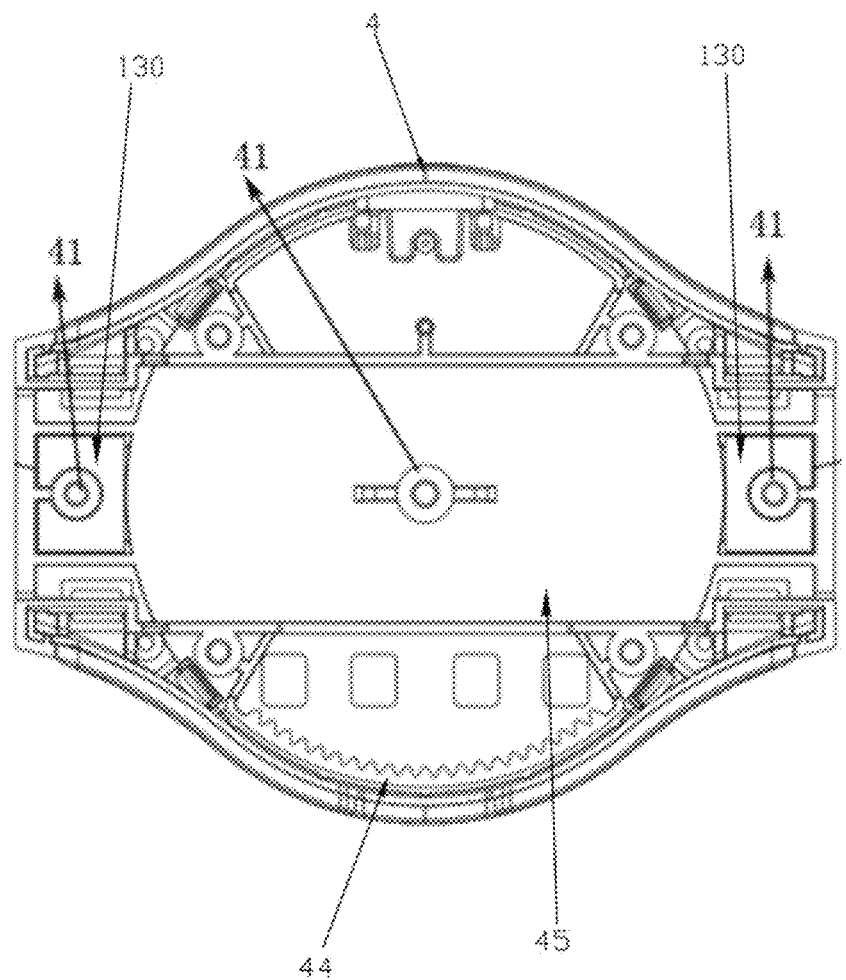
FIG. 3 is a front view of a front housing in the vehicle-mounted mobile phone holder according to the first embodiment of the present invention.

With reference to FIGS. 2 and 3, an intermediate portion of the front housing 4 is of an arcuate structure; and second positioning teeth 44 are disposed on the inner wall of the intermediate portion, and are disposed along the arcuate direction of the front housing 4, Therefore, the second positioning teeth 44 are likewise arcuate. A gear groove 45 is further formed in the middle of the front housing 4 and is configured to accommodate the gear transmission assembly 20. In addition, three positioning protrusions 41 are further disposed on the front housing 4, and are respectively disposed at two ends and a central position of the front housing 4. The three positioning protrusions 41 are connected to the gear transmission assembly 20, thereby defining a movement track of the gear transmission assembly 20.

Figure 4:
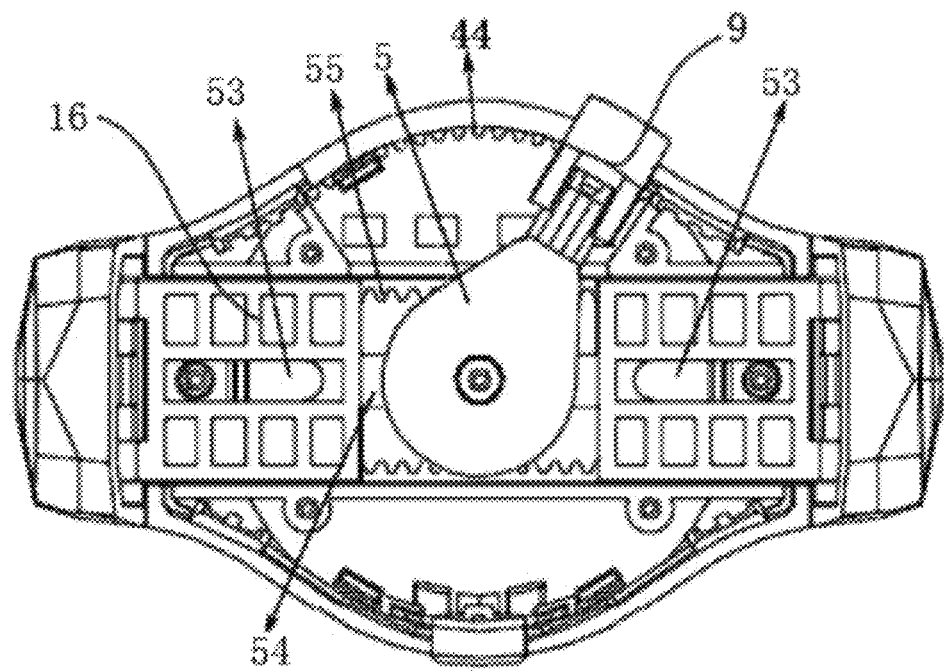
FIG. 4 is a diagram showing connection between a gear transmission assembly and the front housing of the vehicle-mounted mobile phone holder according to the first embodiment of the present invention.

With reference to FIGS. 2, 3 and 4, the gear transmission assembly 20 includes an intermediate gear 5, a gear shifting lever 9 and two inner lower elements 16. The two inner lower elements 16 are connected to the two clamping devices 70 respectively. A shaft-fixing groove 53 is formed in an upper end surface of each of the two inner lower elements 16. The two positioning protrusions 41 disposed on the front housing 4 pass through the shaft-fixing grooves 53 respectively, and the two inner lower elements 16 move along the positioning protrusions 41 respectively. Thus, relative positions of two clamping devices 70 are adjusted. Optionally, the two inner lower elements 16 are connected to the interior of the gear groove 45 in a sliding manner, and the positioning protrusions 41 have an excellent positioning effect on the two inner lower elements 16 respectively. The two inner lower elements 16 are spliced to each other to form a square structure. There is a gear transmission chamber 54 between the inner lower elements 16. The two inner lower elements 16 are independently disposed and are symmetrically disposed on the front housing 4. The inner lower element 16 includes a gear rack 55, and the intermediate gear 5 is mounted in the gear transmission chamber 54 and meshed with the gear rack 55. The intermediate gear 5 mainly functions as a transmission element and a limiting element, so that the two inner lower elements 16 move, and are positioned through the engagement of the intermediate gear 5 and the gear racks 55. It can be obviously seen that the gear transmission chamber 54 is formed by the two gear racks 55, facing each other, of the two inner lower elements 16.

Figure 5:
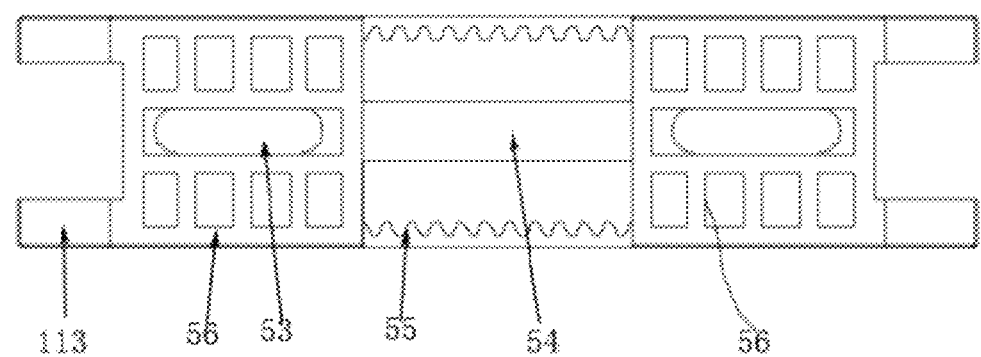
FIG. 5 is a diagram showing a connection relationship between two inner lower elements in the vehicle-mounted mobile phone holder according to the first embodiment of the present invention.

Further, with reference to FIGS. 2 and 5, each inner lower element 16 further includes a sliding portion 56 integrally formed with the gear rack 55, and a connection portion 113 connected to the sliding portion 56. The connection portion 113 is inserted into a rotation groove in one end of a connection arm frame 13. The connection portion 113 is formed by two separate sheets. The connection portion 113 is rotationally connected to the clamping device 70.

In some other embodiments, it is possible that one inner lower element 16 is connected to the interior of the gear groove 45 in a sliding manner, the other inner lower element 16 is fixedly connected to the gear groove 45, and each inner lower element 16 is driven by the intermediate gear 5 to slide, thereby adjusting a distance between the two clamping devices 70. Therefore, at this time, it is possible that only one inner lower element 16 is provided with the gear rack 55. That is, the inner lower element 16 connected to the interior of the gear groove 45 in a sliding manner is provided with the gear rack 55.

With reference to FIG. 3 again, a vibration-damping element 130 is disposed in the front housing 4. Optionally, a recessed groove is formed in the front housing 4 and the vibration-damping element 130 is clamped in the recessed groove and in contact with the inner lower element 16. The vibration-damping element 130 is disposed at a position corresponding to the positioning protrusion 41 at each of two ends of the front housing 4. When the inner lower element 16 slides along the front housing 4, the vibration-damping element 130 has a good buffer effect on the inner lower element 16, thereby reducing damage to the inner lower element 16 during repeated sliding and thus prolonging the service life of the vehicle-mounted roller-type mobile phone holder 100 capable of automatically clamping the mobile phone. It may be understood that the vibration-damping element 130 may also be disposed at other position of the front housing 4 as long as it corresponds to the inner lower element 16. Optionally, the vibration-damping element 130 may be made of foam, sponge EVA (ethylene-vinyl acetate) copolymer or other buffer materials.

Figure 6:
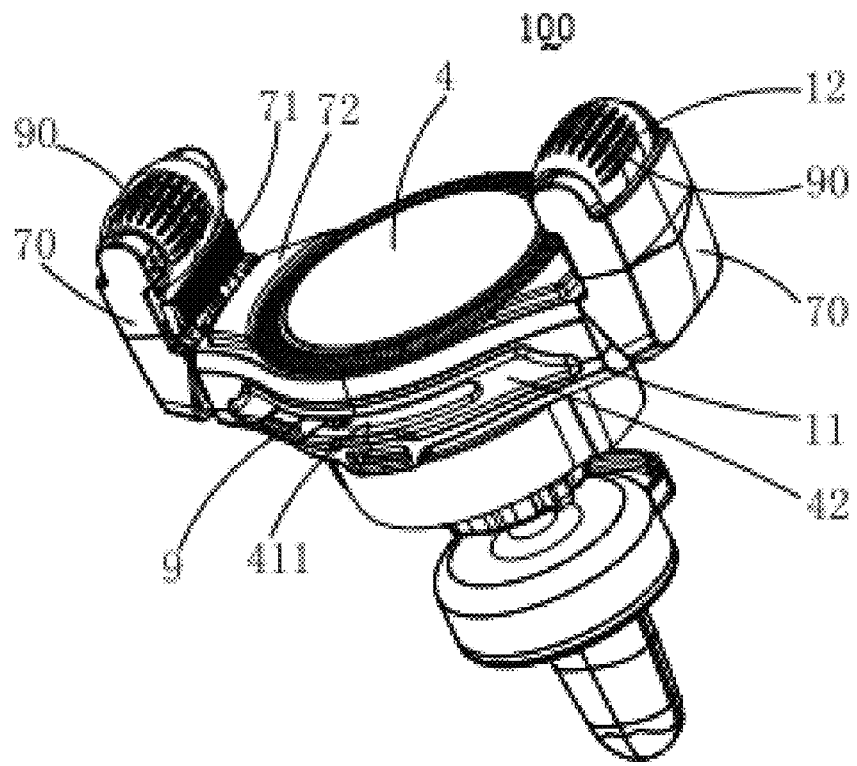
FIG. 6 is another perspective structural diagram of the vehicle-mounted mobile phone holder according to the first embodiment of the present invention.
Figure 7:
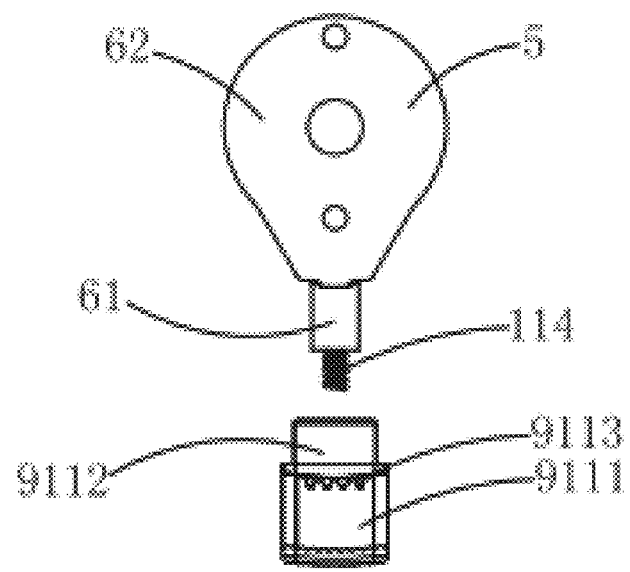
FIG. 7 is a diagram showing connection between an intermediate gear and a gear shifting lever of the vehicle-mounted mobile phone holder according to the first embodiment of the present invention.

With reference to FIGS. 6 and 7, a connection element 42 is further disposed between the front housing 4 and the rear housing 11. The connection element 42 is of an arcuate structure with a radian corresponding to the radian of the arcuate structure of the intermediate portion of the front housing 4. An arcuate shifting groove 411 is further formed in the connection element 42. The gear shifting lever 9 passes through the arcuate shifting groove 411 and partially protrudes from the end surface of the arcuate shifting groove 411.

With reference to FIGS. 4 and 7, the gear shifting lever 9 includes a pressing end 9111 protruding from the end surface of the arcuate shifting groove 411, and a connection end 9112 connected to the pressing end 9111. First positioning teeth 9113 are disposed on the pressing end 9111. The first positioning teeth 9113 correspond to the second positioning teeth 44 disposed on the front housing 4. When the pressing end 9111 is pressed with a finger, the first positioning teeth 9113 are disengaged from the second positioning teeth 44 disposed on the front housing 4. At this time, a user may shift the two clamping devices 70 connected onto the two inner lower elements 16, so that the two gear racks 55 of the inner lower elements 16 slide along the intermediate gear 5, thereby adjusting the relative positions of the two gear racks 55. Thus, the size of the clamping chamber is adjusted to position the mobile phone placed in the clamping chamber. When the two gear racks are adjusted such that the two clamping devices 70 are in contact with the mobile phone and has a clamping force to the mobile phone and the pressing end 9111 is released, the first positioning teeth 9113 are meshed with the second positioning teeth 44 disposed on the front housing 4 to limit the movement of the two inner lower elements 16, thereby fixing the mobile phone in the clamping chamber.

The connection end 9112 is of a hollow chamber structure for connection with the intermediate gear 5. The intermediate gear 5 includes a body 62 meshed with the gear rack 55 and a shank 61 connected to the body 62. The shank 61 is also provided with a hollow chamber. The gear shifting lever 9 further includes a hidden spring 114. The hidden spring 114 is accommodated in the chamber of the connection end 9112 and the chamber of the shank 61. Meanwhile, the shank 61 of the intermediate gear 5 is partially accommodated in the chamber of the connection end 9112. When the pressing end 9111 is pressed, the hidden spring 114 is compressed. When the pressing end 9111 is released, the hidden spring 114 restores to its original shape to push the pressing end 9111 to move towards the outer side of the front housing, so that the first positioning teeth 9113 is meshed with the second positioning teeth 44.

Figure 8:
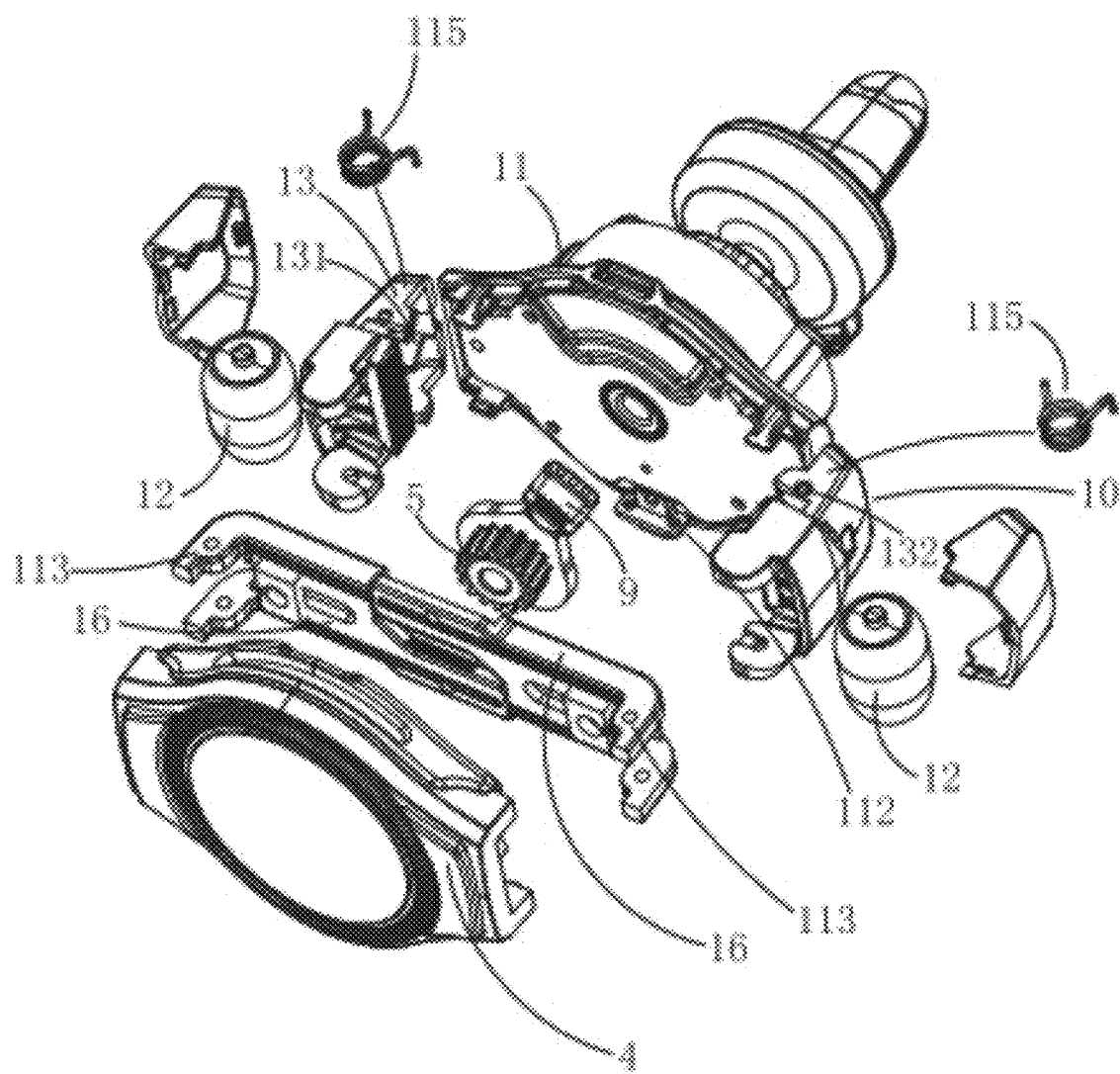
FIG. 8 is another exploded structural diagram of the vehicle-mounted mobile phone holder according to the first embodiment of the present invention.

With reference to FIGS. 6, 7 and 8 further, the clamping device 70 includes an arm cover 10 and the connection arm frame 13. The arm cover 10 and the connection arm frame 13 are fixedly connected to each other or integrally formed. The connection portions 113 of the two inner lower elements 16 are connected to the connection arm frames 13 respectively. Optionally, a connection groove 131 is formed in the connection arm frame 13, and the connection portion 113 is rotationally connected to the interior of the connection groove 131. A first roller shaft hole is formed in the arm cover 10. A first roller 12 is mounted on each of opposite surfaces of the arm covers 10. The first roller 12 is rotationally connected to a first roller shaft (not shown). The first roller shaft is rotationally mounted in the first roller shaft hole in the arm cover 10. As the first roller 12 is disposed and is rotationally connected onto the arm cover 10, the mobile phone can be withdrawn conveniently by rotating the first roller 12 when in need. It may be understood that when mobile phones of the same model are used, after the size of the clamping chamber is adjusted to be appropriate by pressing the pressing end 9111, it is unnecessary to readjust the size of the clamping chamber when the mobile phone of the same model is placed in the clamping chamber next time. Therefore, it is also convenient for placing the mobile phone into the clamping chamber by disposing the first roller 12.

Optionally, in some other embodiments, a first roller sleeve (not numbered) sleeves the first roller 12 and is made of rubber or silica gel material so as to further protect the mobile phone and prevent the mobile from being damaged.

With continued reference to FIG. 8, a pin hole 132 is formed in the connection arm frame 13, and a pin hole 132 is also formed in the connection portion 113 of the inner lower element 16.

With continued reference to FIG. 6, an anti-slip element 71 is further disposed on the clamping device 70. The anti-slip element 71 is made of silica gel or rubber material and mainly serves to prevent the mobile phone from sliding and to prevent the mobile phone housing from being scratched. Optionally, the anti-slip elements 71 are disposed on the connection arm frames 13 and disposed on sides, facing each other, of the two clamping devices 70 respectively. The anti-slip element 71 is sheet-like. In some other embodiments, an anti-slip gasket 72 is further disposed in the front housing 4 and has excellent protection and anti-slip effects on the mobile phone. Likewise, the anti-slip gasket 72 may also be made of silica gel or rubber material. Optionally, the anti-slip gasket 72 is disposed on the surface, fitted with the mobile phone, of the front housing 4. The anti-slip gasket 72 may spread over all surfaces or a partial region of the front housing 4.

Optionally, in some other embodiments, the clamping device 70 includes a second roller (not numbered). The second rollers are mounted on opposite surfaces of the arm covers 10 respectively. The second roller is disposed at the same position as the anti-slip element 71. The first roller 12 and the second roller are stacked along the direction of the arm cover 10 close to the housing 40. The second roller has a diameter less than that of the first roller 12, and a plurality of anti-slip grooves 90 is formed in each of the first roller 12 and the second roller. As such, a clamping chamber formed between the two second rollers is greater than a clamping chamber formed between the two first rollers 12. Thus, it is convenient to clamp mobile phones of different thicknesses, different widths or different lengths. By designing the anti-slip grooves 90, sliding resistance and dropping resistance are achieved and thus it is convenient to place the electronic device. Optionally, it is convenient to clamp and fix a thinner mobile phone between the two second rollers, and a thicker mobile phone between the two first rollers 12.

Optionally, in some specific embodiments, there are two clamping devices 70. The arm cover 10 is provided with the anti-slip element 71. The anti-slip element 71 is disposed between the first roller 12 and the housing 40. A rotating shaft (not shown) is disposed on each of opposite surfaces of the arm covers 10. The anti-slip element 71 is connected to the rotating shaft.

Figure 9:
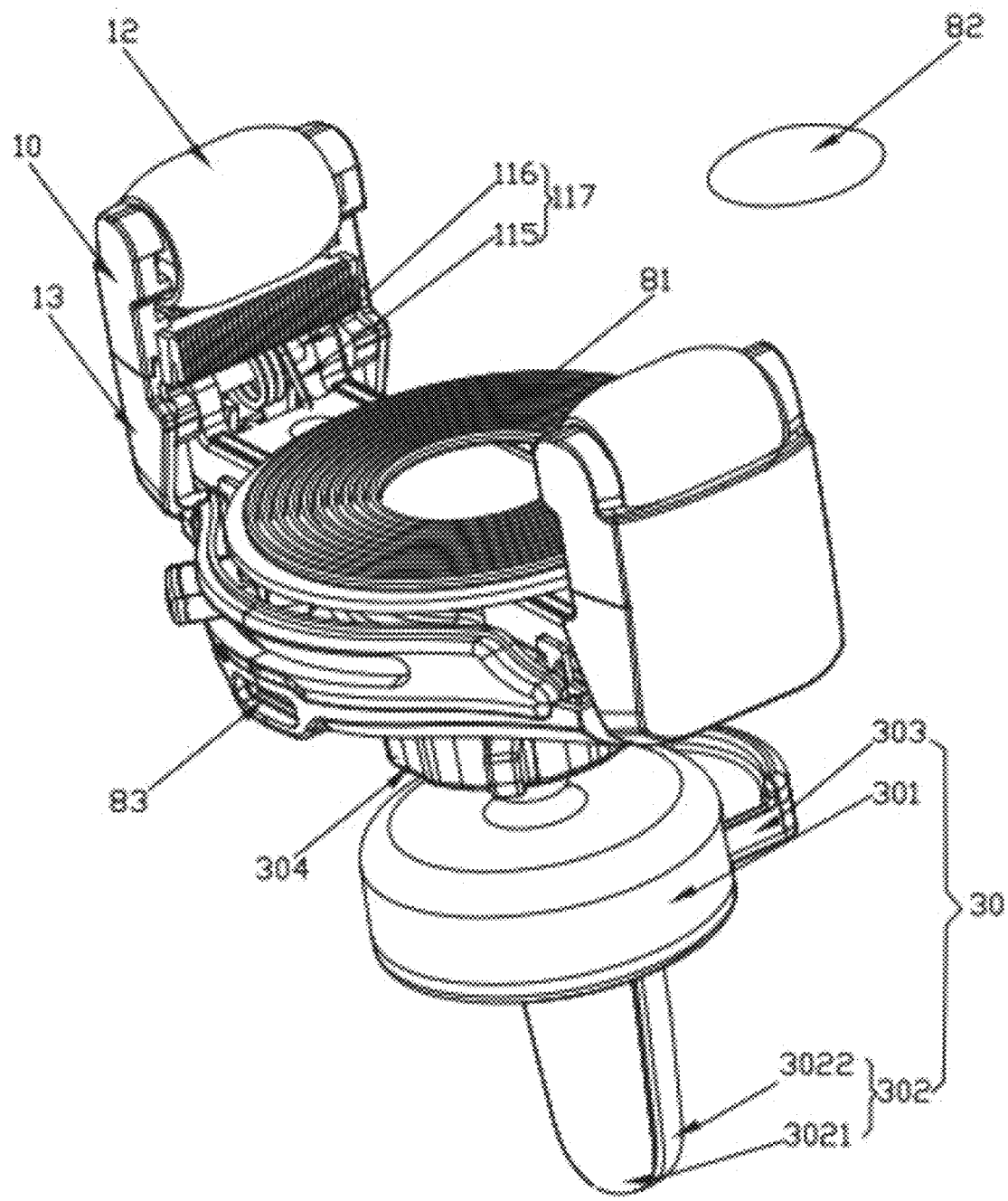
FIG. 9 is a partial structural diagram of the vehicle-mounted mobile phone holder according to the first embodiment of the present invention.

With reference to FIG. 9, a hinge structure 117 is disposed between the connection arm frame 13 and the arm cover 10. The two clamping devices 70 are pulled outwards with the hinge structures 117. As such, it is convenient to place the mobile phone into or withdraw the mobile phone from the clamping chamber. It may also be understood that a mobile phone larger than that placed previously may be placed in the clamping chamber and then is positioned and clamped with a torsion spring 115, and withdrawing modes of these two mobile phones are the same except that the withdrawing directions are opposite. Thus, high convenience is achieved. The angle between the two arm covers 10 as well as the angle between the two connection arm frames 13 relative to the front housing 4 may be adjusted through the hinge structures 117. The hinge structure 117 includes a pin 116 disposed between the connection arm frame 13 and the arm cover 10, and a torsion spring 115 sleeving the pin 116. The pin 116 passes through pin holes 132 which are formed in both the connection portion 113 and the connection arm frame 13 respectively. One end of the torsion spring 115 resists the inner side of the arm cover 10 and the other end thereof resists the inner side of the connection arm frame 13. By disposing the hinge structures 117, the opening of the clamping devices 70 at two ends may be adjusted, so that it is convenient to place and withdraw the mobile phone and it is also convenient to clamp and fix mobile phones of different sizes.

With continued reference to FIG. 9, a wireless charging assembly disposed in the housing 40 includes a charging coil 81 disposed on the side close to the front housing 4, a charging mainboard 82 connected to the charging coil 81, and a charging interface 83 electrically connected to the charging mainboard 82. The charging mainboard 82 is connected to the charging coil 81 so as to control the charging coil 81 to charge the mobile phone. The charging interface 83 is configured to be connected to a peripheral power supply device so as to provide electricity for the electronic device through the charging coil 81 to charge the mobile phone.

With reference to FIG. 8 again, a lamp key 112 is further disposed on the housing 40. The lamp key 112 is electrically connected to the charging mainboard 82. When the charging coil 81 charges the mobile phone, the lamp key 112 lights up, indicating that the mobile phone is under a normal charging state.

With continued reference to HG. 9, a fixing element 30 is connected onto the rear housing 11. As the fixing element 30 may be clamped and fixed at an air outlet of an air conditioner of a vehicle, it is convenient for the user to use the mobile phone during driving. Of course, it may be understood that the fixing element 30 may also be connected and fixed to other external device to position the mobile phone and thus it is convenient for the user to use the mobile phone. The fixing element 30 includes a fixing portion 301, a clamping arm 302 connected to the fixing portion 301 and a button 303 connected to the clamping arm 302. The clamping arm 302 includes a first clamping arm 3021 and a second clamping arm 3022. A clamping opening is formed between the first clamping arm 3021 and the second clamping arm 3022. Optionally, the first clamping arm 3021 is connected to the button 303. The size of the clamping opening is adjusted by pressing the button 303, so that the fixing element 30 is connected to an external fixing portion to position the mobile phone.

With continued reference to FIG. 9, the fixing element 30 further includes a rotary connection element 304. One end of the rotary connection element 304 is fixedly connected to the rear housing 11 and the other end thereof is rotationally connected to the fixing portion 301, so that it is convenient to adjust the position of the mobile phone relative to the user. It may be understood that it is possible to dispose a universal wheel at an end of the fixing portion 301 connected to the rotary connection element 304. The universal wheel is connected to the rotary connection element 304 in a sleeving manner, and thus the rotary connection between the universal wheel and the rotary connection element is achieved.

Figure 10:
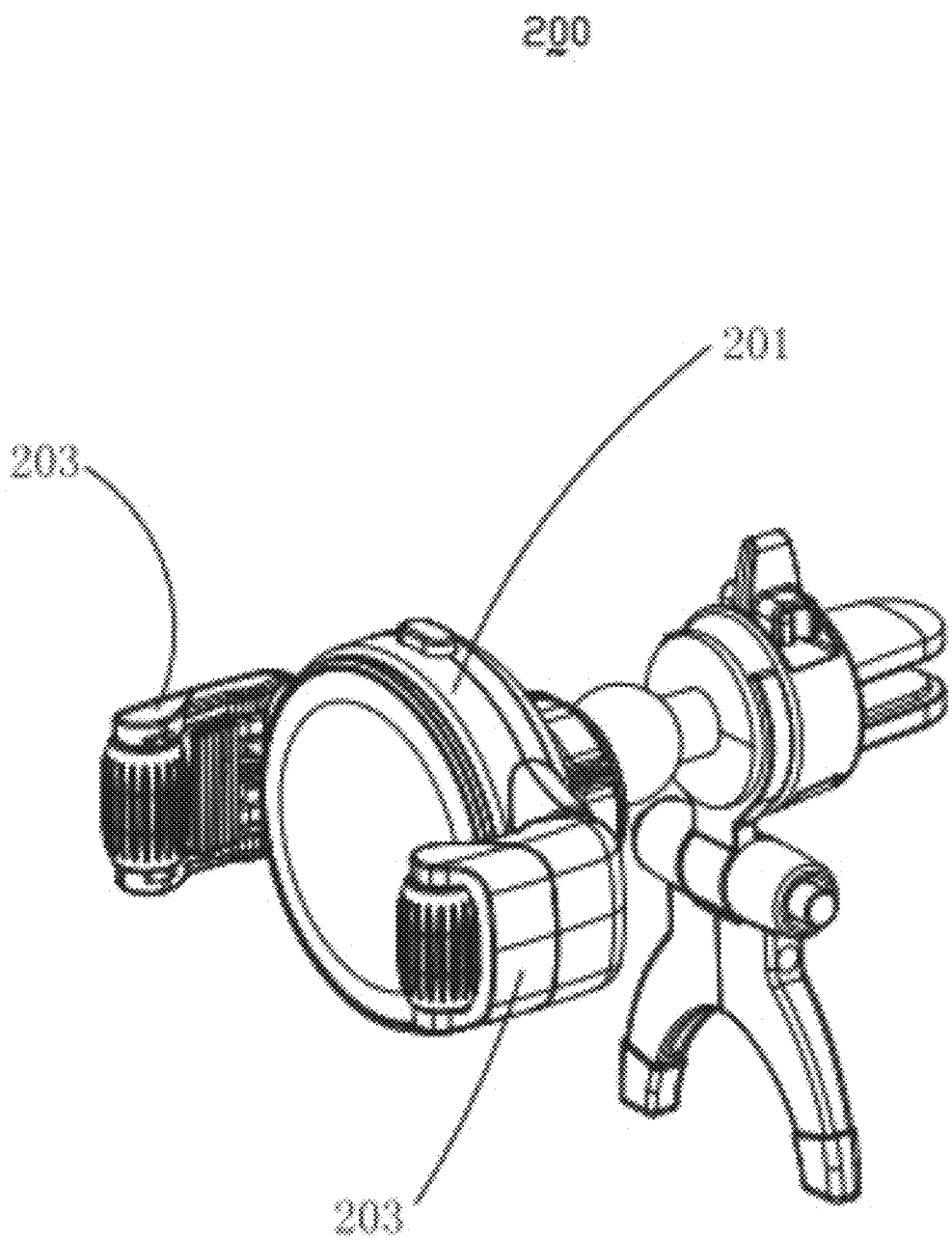
FIG. 10 is a perspective structural diagram of a vehicle-mounted mobile phone holder according to a second embodiment of the present invention.
Figure 11:
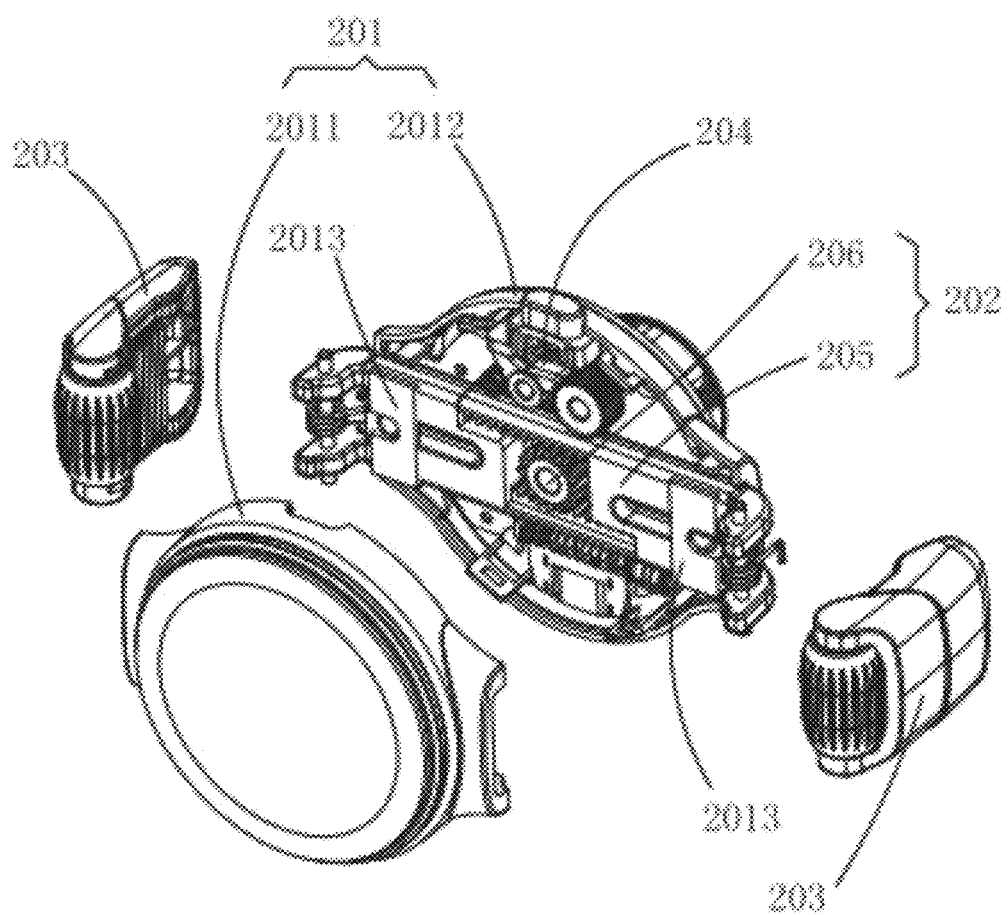
FIG. 11 is an exploded structural diagram of the vehicle-mounted mobile phone holder according to the second embodiment of the present invention.

With reference to FIGS. 10 and 11, a second embodiment of the present invention provides a vehicle-mounted mobile phone holder 200 and mainly differs from the first embodiment in that specific structures of gear transmission assemblies and specific structures of fixing elements are different. The vehicle-mounted mobile phone holder 200 is configured to clamp and fix an electronic device. The vehicle-mounted mobile phone holder 200 includes a housing 201, a gear transmission assembly 202 connected to the housing 201, and at least two clamping devices 203 and a control element 204 which are connected to the gear transmission assembly 202. The clamping devices 203 cooperate with the housing 201 to clamp a mobile phone. The gear transmission assembly 202 includes at least one inner lower element 205 connected to the interior of the housing 201 in a sliding manner, and an intermediate gear 206 connected to the inner lower element 205 in a linkage manner. The at least one inner lower element 205 is connected to one of the clamping devices 203. The control element 204 is pressed to drive the intermediate gear 206 to rotate, so that the inner lower elements 205 drive the clamping devices 203 to move close to or away from each other.

With reference to FIG. 11, the housing 201 includes a first housing 2011 and a second housing 2012 connected to the first housing 2011. The gear transmission assembly 202 and the control element 204 are accommodated between the first housing 2011 and the second housing 2012. An intermediate portion of each of the first housing 2011 and the second housing 2012 is of an arcuate structure. A vibration-damping element 2013 is disposed at a position, corresponding to the inner lower element 205, of the first housing 2011. The vibration-damping element 2013 is in contact with the inner lower element 205.

Figure 12:
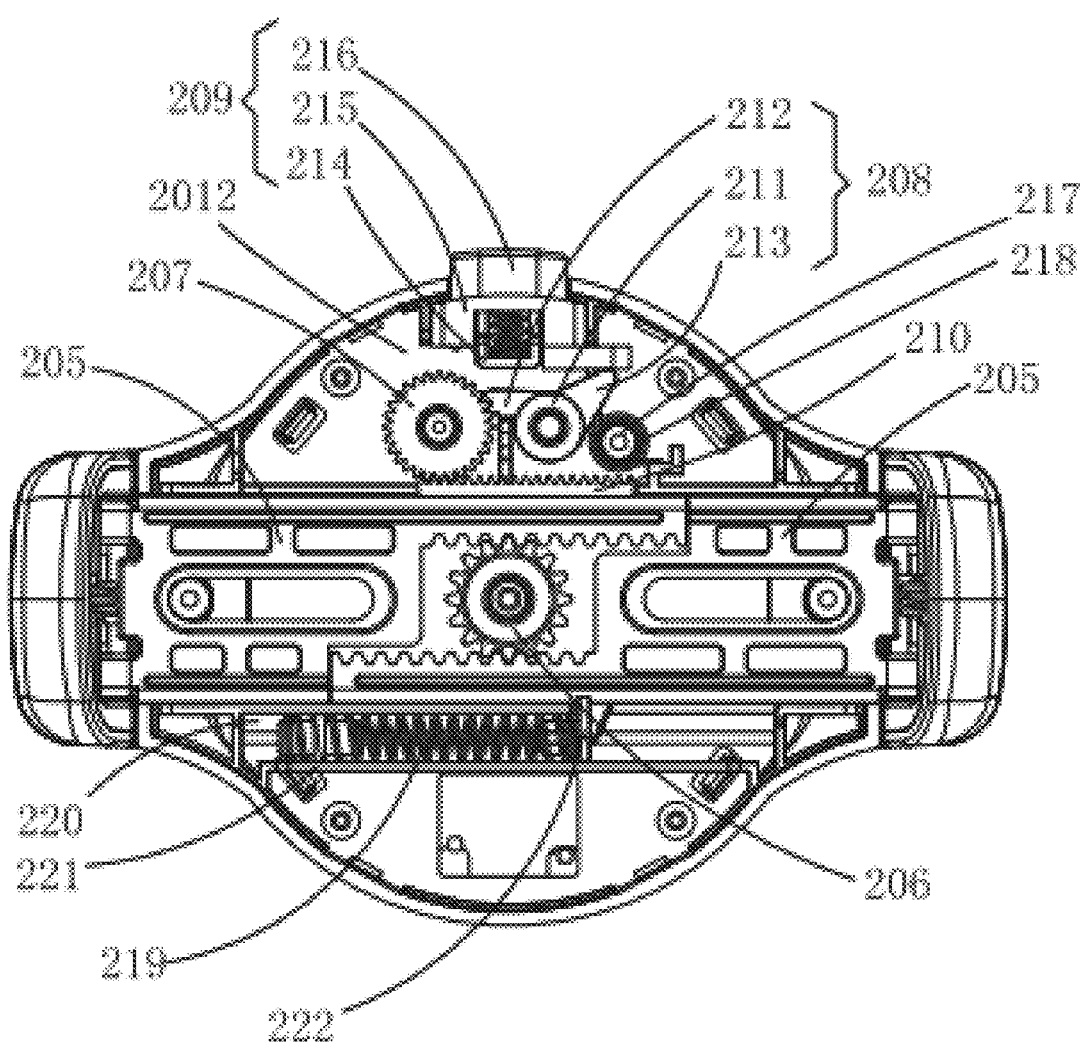
FIG. 12 is a diagram showing a connection relationship in a housing of the vehicle-mounted mobile phone holder according to the second embodiment of the present invention.

With reference to FIG. 12, the control element 204 includes at least one transmission gear 207 and a rotation element 208 which are rotationally connected to the second housing 2012, a key 209 movably connected to the second housing 2012, and a sliding rack 210 disposed at the side, away from the intermediate gear 206, of the inner lower element 205. The rotation element 208 includes an intermediate element 211 rotationally connected to the second housing 2012, and an engagement element 212 and a resisting element 213 which are connected to the intermediate element 211. The engagement element 212 and the resisting element 213 are disposed at an angle relative to the intermediate element 211. The transmission gear 207 is connected to both the sliding rack 210 and the engagement element 212. The resisting element 213 abuts against the key 209. When being pressed, the key 209 moves toward the side of the intermediate gear 206 and abuts against the resisting element 213, so that the resisting element 213 drives the intermediate element 211 to rotate, and further the intermediate element 211 drives the engagement element 212 to rotate. At this time, the engagement element 212 is disengaged from the transmission gear 207.

With continued reference to FIG. 12, the key 209 includes a support 214 fixedly connected to the second housing 2012, a pressing element 216 elastically connected to the support 214, and a sliding element 215 connected to the pressing element 216. The pressing element 216 is exposed to the second housing 2012, and the sliding element 215 is in contact with the resisting element 213. The control element 204 includes a connection shaft 217 and a return spring 218 sleeving the connection shaft 217. Two ends of the return spring 218 abut against the resisting element 213 and the second housing 2012 respectively in an elastic direction of the return spring 218. Optionally, in some other embodiments, the return spring 218 is a torsion spring. The second housing 2012 protrudes to form a placement table (not numbered), and two ends of the torsion spring in the elastic direction abut against the resisting element 213 and the placement table respectively.

The at least one inner lower element 205 is connected to a counterforce spring 219, When the mobile phone is clamped and fixed, the engagement element 212 is fixedly connected to the transmission gear 207 and thus the movement of the inner lower element 205 is limited. At this time, the counterforce spring 219 is in a compressed state. When the key 209 is pressed, the engagement element 212 is disengaged from the transmission gear 207. At this time, the counterforce spring 219 restores to its original shape to push the inner lower elements to slide away from each other.

During use, when the key 209 is pressed, the key 209 moves towards the side of the intermediate gear 206, the sliding element 215 abuts against the resisting element 213, and the return spring 218 is in the compressed state. As a result, the resisting element 213 drives the intermediate element 211 to rotate, and further the intermediate element 211 drives the engagement element 212 to rotate. At this time, the engagement element 212 is disengaged from the transmission gear 207, the counterforce spring 219 connected to the at least one inner lower element 205 restores to its original shape, and then the counterforce spring 219 drives the inner lower element 205 to move, thereby driving the clamping devices 203 to move away from each other. At this time, the mobile phone may be placed between the clamping devices 203.

When the key 209 is released, at this time, the return spring 218 restores to its original shape, thereby driving the resisting element 213 to drive the key 209 to slide away from the side of the intermediate gear 206. At this time, the resisting element 213 drives the intermediate element 211 to rotate, further the intermediate element 211 drives the engagement element 212 to rotate, and thus the engagement element 212 is meshed with the transmission gear 207. Hence, the transmission gear 207, the sliding rack 210 and the intermediate gear 206 are in a locking state. When it needs to clamp the mobile phone, a three is externally applied to at least one of the clamping devices 203 and the clamping devices 203 are close to each other. At this time, the counterforce spring 219 is in the compressed state, the transmission gear 207 is rotationally connected to the engagement element 212 and the sliding-resisting elements (not shown) on the clamping devices 203 clamp and fix the mobile phone.

With reference to FIGS. 11 and 12, optionally, in some specific embodiments, a limiting groove 220 is further formed in the second housing 2012 and an extension direction of the limiting groove 220 is consistent with a movement direction of the inner lower element 205. The counterforce spring 219 is clamped in the limiting groove 220.

Optionally, in some other embodiments, there are two inner lower elements 205, with only one inner lower element 205 being provided with a sliding rack 210. The inner lower element 205 without the sliding rack 210 is fixedly connected to the second housing 2012. It may be understood that the inner lower element 205 provided with the sliding rack 210 is connected to the counterforce spring 219. It may also be understood that when the two inner lower elements 205 are provided with the sliding racks 210 respectively, each inner lower element 205 is connected to one counterforce spring 219.

Figure 13:
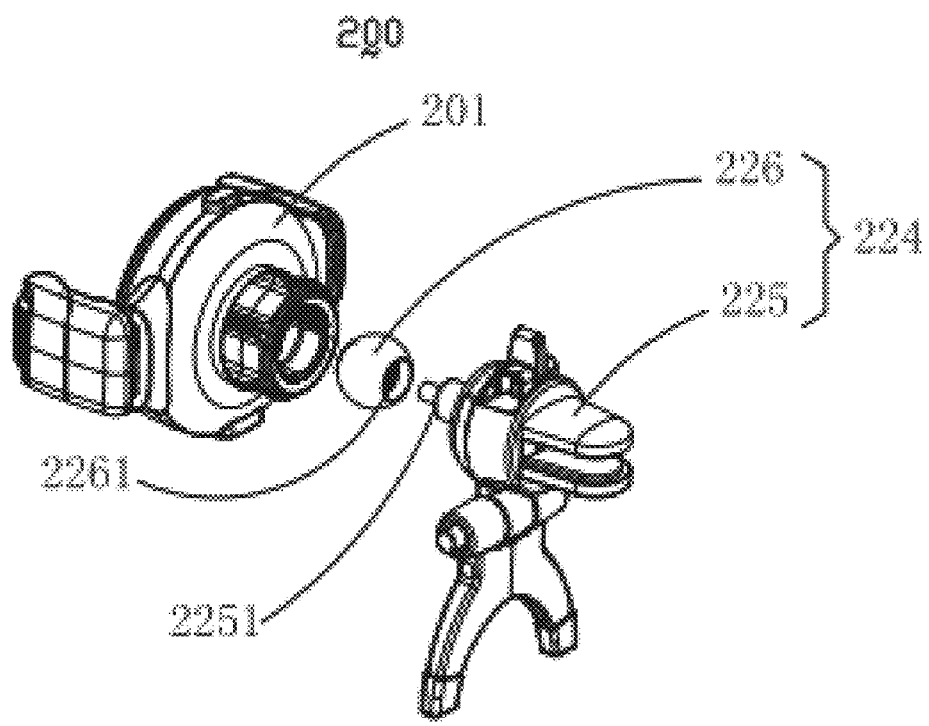
FIG. 13 is another exploded structural diagram of the vehicle-mounted mobile phone holder according to the second embodiment of the present invention.
Figure 14:
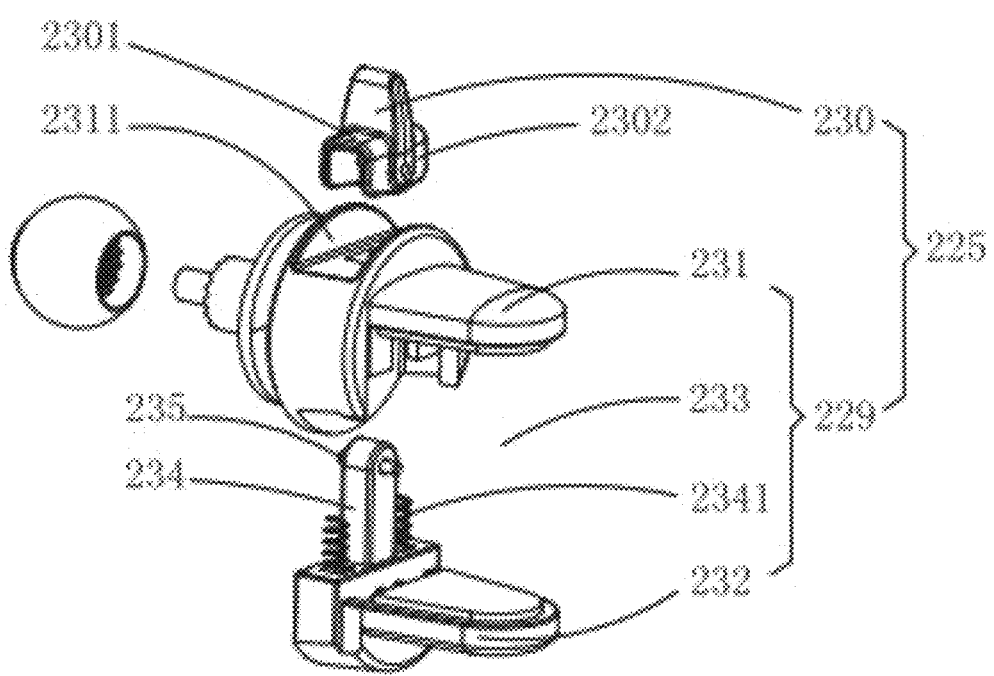
FIG. 14 is an exploded structural diagram of a fixing element of the vehicle-mounted mobile phone holder according to the second embodiment of the present invention.

With reference to FIG. 13, the vehicle-mounted mobile phone holder 200 further includes a fixing element 224 rotationally connected to the housing 201. The fixing element 224 is configured to fix the mobile phone 201 to the outside. The fixing element 224 includes a connection portion 225 connected to the outside, and a universal bail 226 rotationally connected to the housing 201. The universal ball 226 sleeves the connection portion 225. The universal ball 226 is provided with a first connection gear 2261, the connection portion 225 is provided with a second connection gear 2251, and the first connection gear 2261 is meshed with the second connection gear 2251. With reference to FIG. 14, the connection portion 225 further includes a clamping arm 229 and a limiting block 230 connected to the clamping arm 229. The clamping arm 229 includes a first clamping arm 231 and a second clamping arm 232 connected to the first clamping arm 231 in a sliding manner. A clamping opening 233 is formed between the first clamping arm 231 and the second clamping arm 232.

The second clamping arm 232 extends towards one side of the first clamping arm 231 to form a rotation element 234. The rotation element 234 passes through the first clamping arm 231 and is rotationally connected to the limiting block 230. The rotation element 234 passes through and is exposed to the first clamping arm 231. A limiting shaft 235 is disposed at the side of the rotation element 234 away from the second clamping arm 232, and is rotationally connected to the limiting block 230. The connection portion 225 further includes a clamping arm elastomer 2341. Two ends of the clamping arm elastomer 2341 are fixedly connected to the first clamping arm 231 and the second clamping arm 232 respectively in an elastic direction of the clamping arm elastomer 2341, The limiting blocks 230 extend towards two opposite sides to form a first limiting element 2301 and a second limiting element 2302. An extension distance of the first limiting element 2301 is greater than an extension distance of the second limiting element 2302.

When the limiting block 230 moves away from the side of the first clamping arm 231, and the limiting block 230 rotates around the limiting shaft 235 towards the side of the first limiting element 2301 till the end, away from the first clamping arm 231, of the limiting block 230 abuts against the first clamping arm 231 or the end, away from the limiting block 230, of the first limiting element 2301 abuts against the first clamping arm 231, the limiting block 230 drives the rotation element 234 so as to drive the second clamping arm 232 to move towards of the side of the first clamping arm 231. At this time, the clamping opening 233 becomes smaller and the first clamping arm 231 and the second clamping arm 232 are close to each other and in a clamping state.

The principle that the limiting block 230 moves away from the first clamping arm 231 side, and the limiting block 230 rotates around the limiting shaft 235 towards the side of the second limiting element 2302 is the same as the principle that the limiting block 230 moves away from the side of the first clamping arm 231, and the limiting block 230 rotates around the limiting shaft 235 towards the side of the first limiting element 2301, except that directions are opposite. By adopting such a design that the extension distance of the first limiting element 2301 is greater than the extension distance of the second limiting element 2302, the distance between the first clamping arm 231 and the second clamping arm 232 when the limiting block 230 rotates towards the side of the first limiting element 2301 is less than the distance between the first clamping arm 231 and the second clamping arm 232 when the limiting block 230 rotates towards the side of the second limiting element 2302. Thus, the clamping degree of the first clamping arm 231 and the second clamping arm 232 may be changed through the extension lengths of the first limiting element 2301 and the second limiting element 2302. That is, the size of the clamping opening 233 is adjusted by pulling the limiting block 230 to rotate towards either of two sides perpendicular to the sliding direction of both the first clamping arm 231 and the second clamping arm 232. Thus, the vehicle-mounted mobile phone holder is suitable for many usage scenes and has many functions.

Optionally, in some specific embodiments, the first clamping arm 231 recesses towards one side of the limiting block 230 to form a groove 2311 and the groove 2311 accommodates the limiting block 230.

Figure 15:
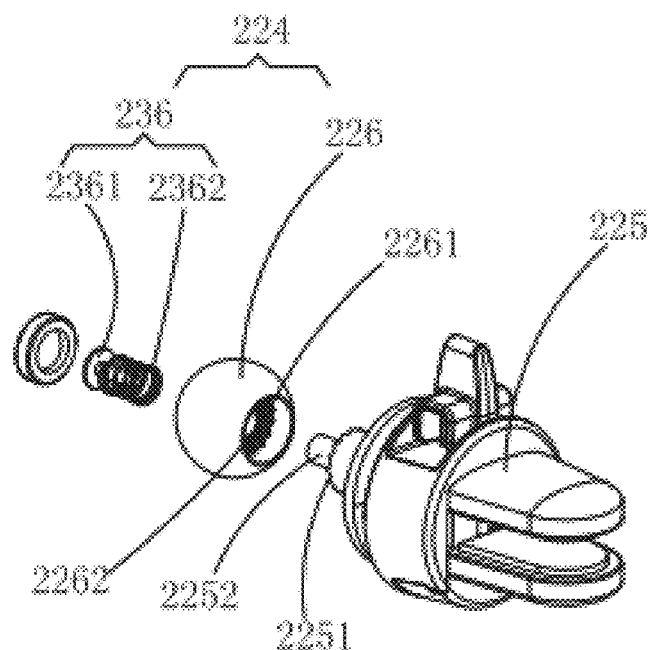
FIG. 15 is another exploded structural diagram of the fixing element of the vehicle-mounted mobile phone holder according to the second embodiment of the present invention.

With reference to FIG. 15, the fixing element 224 further includes a fastening element 236 which passes through the universal hall 226 and then is connected to the connection portion 225. The fastening element 236 includes a tightening element 2361 connected to the connection portion 225 and a connection spring 2362 sleeving the tightening element. Two ends of the connection spring 2362 are connected to the tightening element 2361 and the universal ball 226 respectively in an elastic direction of the connection spring 2362. The universal ball 226 recesses towards one side of the connection portion 225 to form a hollow fixing core 2262. The first connection gear 2261 is disposed on the fixing core 2262.

The connection portion 225 further includes a fixing pillar 2252 connected to the fastening element 236; and the fixing pillar 2252 is of a hollow structure. By screwing the tightening element 2361 and compressing the connection spring 2362, the first connection gear 2261 is meshed with the second connection gear 2251. With this design, the connection of the fastening element 236 and the fixing pillar 2252 achieves gear engagement of the first connection gear 2261 and the second connection gear 2251 and gear torsion between the first connection gear 2261 and the second connection gear 2251. As a result, the universal ball 226 and the connection portion 225 are connected more closely and the universal ball 226 transmits rotational torque to the connection portion 225 more accurately. The first connection gear 2261 is meshed with the second connection gear 2251 by screwing the tightening element 2361.

Figure 16:
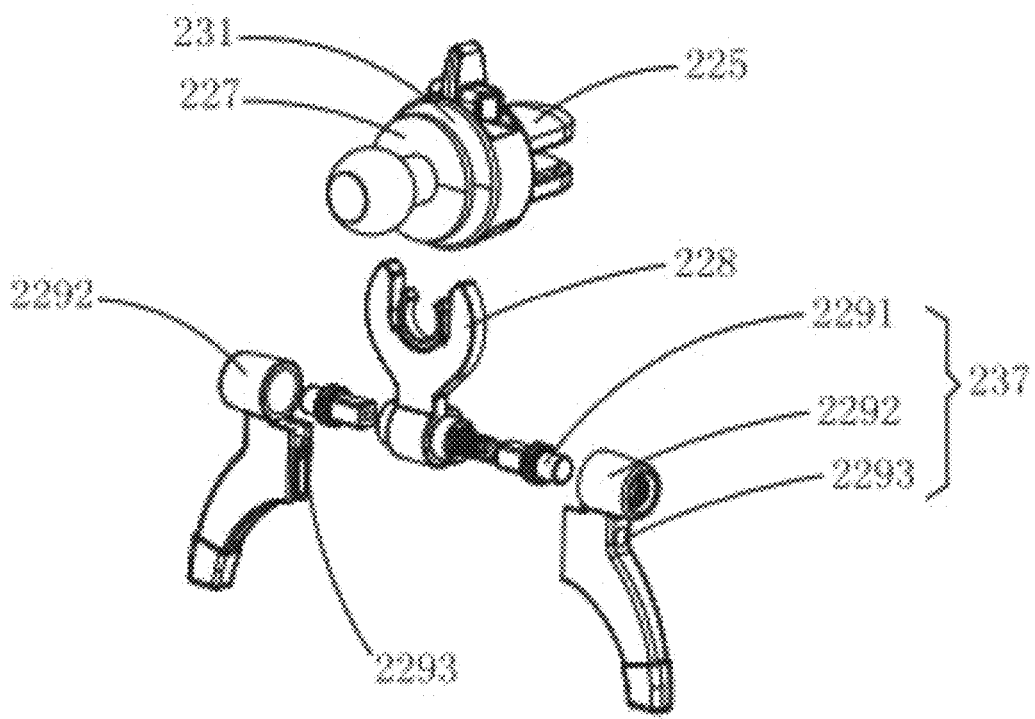
FIG. 16 is yet another exploded structural diagram of the fixing element of the vehicle-mounted mobile phone holder according to the second embodiment of the present invention.

With reference to FIG. 16, the connection portion 225 further includes a connection block 227 spaced from the first clamping arm 231. The fixing element 224 further includes a clamping element 228 and at least two locking portions 237 elastically connected to two sides of the clamping element 228 respectively. The clamping element 228 clamps the connection portion 225 and is disposed between the connection block 227 and the first clamping arm 231. The locking portions 237 include at least two elastically-connected locking elements 2291, and placement elements 2292 for connection with the locking elements 2291 in a penetrating manner. The locking element 2291 passes through the placement element 2292 and partially protrudes from the placement element, and is meshed and connected with the placement element 2292. A connection hole 2293 is formed in the placement element 2292. A fastening element (not shown) passes through the connection holes 2293 to achieve fixed connection between the locking elements 2291. When the locking elements 2291 are pressed simultaneously, the locking elements 2291 are disengaged from the placement elements 2292. The angle of the placement element 2292 relative to the clamping element 228 is adjusted by rotating the placement element 2292. With this design, by rotating the locking element 2291, the placement element 2292 is driven to rotate around the clamping element 228; the placement element 2292 and the clamping element 228 form the angle; and the placement element 2292 may be horizontally placed on a plane outside. Thus the structure is firm.

Figure 17:
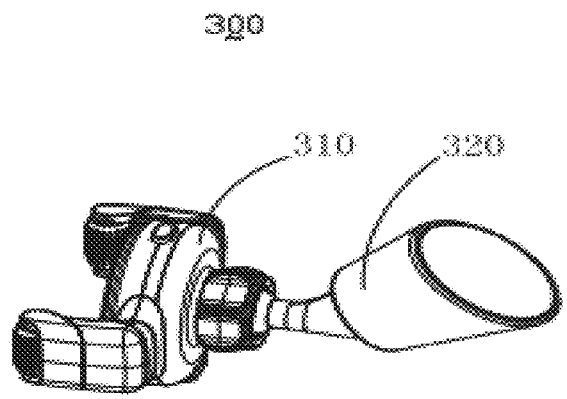
FIG. 17 is a perspective structural diagram of a vehicle-mounted mobile phone holder according to a third embodiment of the present invention.
Figure 18:
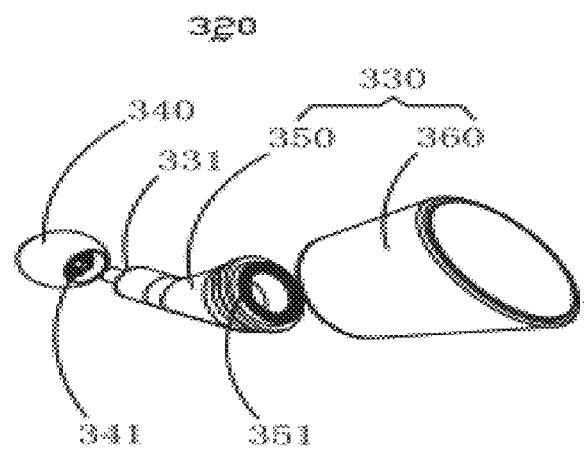
FIG. 18 is an exploded structural diagram of a fixing element of the vehicle-mounted mobile phone holder according to the third embodiment of the present invention.
Figure 19:
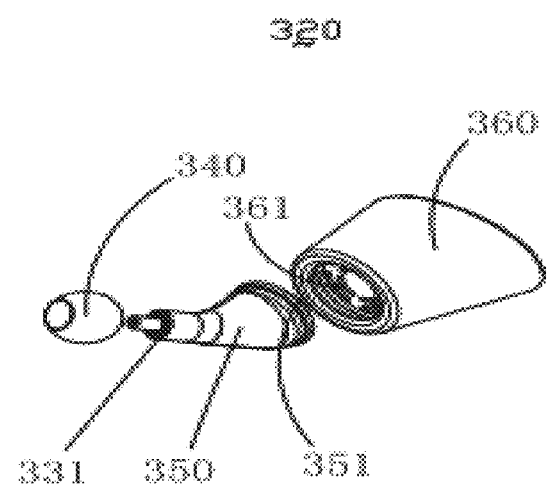
FIG. 19 is another exploded structural diagram of the fixing element of the vehicle-mounted mobile phone holder according to the third embodiment of the present invention.

With reference to FIGS. 17, 18 and 19, a third embodiment of the present invention provides a vehicle-mounted mobile phone holder 300 for clamping and fixing an electronic device. The vehicle-mounted mobile phone holder 300 includes a housing 310 and a fixing element 320 rotationally connected to the housing 310. The fixing element 320 is configured to fix the housing 310 to the outside. This embodiment mainly differs from the second embodiment in that structures of connection portions are different. The fixing element 320 includes a connection portion 330 connected to the outside, and a universal ball 340 rotationally connected to the housing 310. The universal ball 340 sleeves the connection portion 330, and is provided with a first connection gear 341. The connection portion 330 is provided with a second connection gear 331; and the first connection gear 341 is meshed with the second connection gear 331. The connection portion 330 includes a connection seat 350 and a fixing seat 360 connected to the outside. A third connection gear 351 is disposed at the end of the connection seat 350 away from the universal ball 340. A fourth connection gear 361 is disposed on one side of the fixing seat 360 facing the connection seat 350. The third connection gear 351 is meshed and connected to the fourth connection gear 361; and the fixing seat 360 sleeves the connection seat 350. The third connection gear 351 is connected to the fourth connection gear 361, so that the fixing seat is connected to the connection seat 350 more stably and the universal ball 340 transmits rotational torque to the connection portion 330 more accurately. The vehicle-mounted mobile phone holder 300 may be fixed to the outside by disposing glue on the fixing seat 360.

Compared with the prior art, the vehicle-mounted mobile phone holder according to the present invention has the following benefits.

1. The clamping devices cooperate with the housing to clamp the mobile phone. The gear transmission assembly includes the at least one inner lower element connected to the interior of the housing in a sliding manner, and the intermediate gear connected to the inner lower element in a linkage manner. The at least one inner lower element is connected to one of the clamping devices; and the control element is pressed to drive the intermediate gear to rotate, so that the inner lower element drives the clamping devices to move close to or away from each other. A distance between the clamping devices can be adjusted by driving the intermediate gear. Thus, it is convenient to place the mobile phone in the clamping chamber for fixing and also convenient for the user to use in driving. There is no need to dispose a bearing structure, which is similar to a gravity holder, for bearing the mobile phone in a third direction, so that it is more convenient to clamp the electronic device. The two inner lower elements are disposed oppositely and are meshed with the intermediate gear, so that the intermediate gear acts as the transmission element and the limiting element and can well adjust and control the relative movement of the inner lower elements. Thus, the distance between the two clamping devices can be well adjusted. and controlled.

2. The vehicle-mounted mobile phone holder further includes the fixing element rotationally connected to the housing. The fixing element includes the connection portion connected to the outside, and the universal ball rotationally connected to the housing. The universal ball sleeves the connection portion, and is provided with the first connection gear. The connection portion is provided with the second connection gear. The first connection gear is meshed with the second connection gear. The connection of the fastening element and the connection portion achieves gear engagement of the first connection gear and the second connection gear and gear torsion between the first connection gear and the second connection gear. As a result, the universal ball and the connection portion are connected more closely and the universal ball transmits rotational torque to the connection portion more accurately. The first connection gear is meshed with the second connection gear by screwing the fastening element.

3. The clamping degree of the first clamping arm and the second clamping arm may be changed through the extension length of the limiting block. That is, the size of the clamping opening is adjusted by pulling the limiting block to rotate towards either of two sides perpendicular to the sliding direction of both the first clamping arm and the second clamping arm, so that the vehicle-mounted mobile phone holder is suitable for many usage scenarios and has many functions.

4. When the locking elements are pressed simultaneously, the locking elements are disengaged from the placement elements. The angle of the placement element relative to the clamping element is adjusted by rotating the placement element. With this design, by rotating the locking element, the placement element is driven to rotate around the clamping element; the placement element and the clamping element form the angle; and the placement element may be horizontally placed on the plane outside. Thus the structure is firm.

The above description is only preferred embodiments of the present invention, and is not intended to limit the present invention. Any modifications, equivalent replacements, improvements and the like made within the principles of the present invention should be included within the scope of protection of the present invention.

The invention claimed is:

1. A vehicle-mounted mobile phone holder, comprising: a housing, a gear transmission assembly connected to the housing, at least two clamping devices connected to the gear transmission assembly, and a control element, wherein the at least two clamping devices cooperate with the housing to clamp a mobile phone; the gear transmission assembly comprising at least one inner lower element connected to the interior of the housing in a sliding manner, and an intermediate gear connected to the at least one inner lower element in a linkage manner; the at least one inner lower element comprising correspondingly a gear rack engaged with the intermediate gear, wherein the at least one inner lower element is connected to one of the at least two clamping devices; the control element comprising a transmission gear and a rotation element which are rotationally connected to the housing, a key movably connected to the housing, and a sliding rack disposed at the side, away from the intermediate gear, of the at least one inner lower element, the rotation element comprising an engagement element and a resisting element which are disposed oppositely, wherein the transmission gear is connected to the sliding rack and the engagement element respectively, and the resisting element abuts against the key; when the key is pressed, the key moves towards the intermediate gear and abuts against the resisting element, which pushes the engagement element to rotate and to disengage from the transmission gear; and at this time, the gear rack of the at least one inner lower element slides along the intermediate gear; when the key is released, the engagement element becomes engaged with the transmission gear, and the gear rack stops sliding while the intermediate gear stops rotating.

2. The vehicle-mounted mobile phone holder according to claim 1, wherein two inner lower elements and two clamping devices are provided, each of the inner lower elements is connected to each of the clamping devices.

3. The vehicle-mounted mobile phone holder according to claim 1, wherein the rotation element further comprises an intermediate element connecting the engagement element and the resisting element, the intermediate element is rotationally connected to the housing; the engagement element and the resisting element are disposed at an angle relative to the intermediate element.

4. The vehicle-mounted mobile phone holder according to claim 3, wherein the key comprises a support fixedly connected to the housing, and a pressing element elastically connected to the support; the pressing element is connected to the interior of the housing in a sliding manner, and one end of the pressing element is exposed to the housing, and the other end of the pressing element abuts against the resisting element.

5. The vehicle-mounted mobile phone holder according to claim 4, wherein the control element further comprises a connection shaft and a return spring sleeved on the connection shaft; two ends of the return spring in an elastic direction abut against the resisting element and the housing respectively; when the pressing element is pressed, the return spring is in a compressed state.

6. The vehicle-mounted mobile phone holder according to claim 2, wherein the at least one inner lower element is connected to a counterforce spring; a deformation direction of the counterforce spring is the same as a sliding direction of the at least one inner lower element; when the at least two clamping devices clamp an electronic device, the counterforce spring is in a compressed state;

and when the electronic device is required to be released, the pressing element is pressed, the engagement element is disengaged from the transmission gear, and the counterforce spring restores to its original shape to push the two inner lower elements to slide away from each other.

7. The vehicle-mounted mobile phone holder according to claim 1, further comprising: a fixing element rotationally connected to the housing, wherein the fixing element comprises a connection portion connected to the outside, and a universal ball rotationally connected to the housing; the connection portion is sleeved in the universal ball, the universal ball is provided with a first connection gear, the connection portion is provided with a second connection gear, and the first connection gear is engaged with the second connection gear.

8. The vehicle-mounted mobile phone holder according to claim 7, wherein the fixing element further comprises a tightening element and a connection spring; the connection spring is sleeved on the tightening element, the tightening element passes through the universal ball and is screwed to the connection portion; the connection spring is in a compressed state, the first connection gear is engaged with the second connection gear by screwing the tightening element.

9. The vehicle-mounted mobile phone holder according to claim 7, wherein the connection portion further comprises a clamping arm and a limiting block connected to the clamping arm, the clamping arm comprises a first clamping arm, and a second clamping arm connected to the first clamping arm in a sliding manner; a clamping opening is formed between the first clamping arm and the second clamping arm;

the second clamping arm extends towards one side of the first clamping arm to form a rotation element, the rotation element passes through the first clamping arm and is rotationally connected to the limiting block; the connection portion further comprises a clamping arm elastomer, two ends of the clamping arm spring in an elastic direction are connected to the first clamping arm and the second clamping arm respectively, and the size of the clamping opening is adjusted by pulling the limiting block to rotate towards either of two sides perpendicular to the sliding direction of the first clamping arm and the second clamping arm; or the connection portion comprises a connection seat connected to the universal ball and a fixing seat connected to the outside, the connection seat is engaged and connected with the fixing seat, and the fixing seat is sleeved on the connection seat.

10. The vehicle-mounted mobile phone holder according to claim 9, wherein the fixing element further comprises a clamping element, and at least two locking portions elastically connected to two sides of the clamping element respectively; the clamping element clamps the connection portion, the locking portions comprise at least two elastically-connected locking elements, and placement elements for connection with the at least two locking elements in a penetrating manner; the at least two locking elements passes through the placement elements and partially protrudes from the placement elements, the at least two locking elements are engaged with the placement elements; when the at least two locking elements are pressed simultaneously, the at least two locking elements are disengaged from the placement elements; and the angle of the placement elements relative to the clamping element is adjusted by rotating the placement elements.

11. A vehicle-mounted mobile phone holder, comprising: a housing, a gear transmission assembly connected to the housing, at least two clamping devices connected to the gear transmission assembly, and a control element, wherein the at least two clamping devices cooperate with the housing to clamp a mobile phone; the gear transmission assembly comprising at least one inner lower element connected to the interior of the housing in a sliding manner, and an intermediate gear connected to the at least one inner lower element in a linkage manner; the at least one inner lower element comprising correspondingly a gear rack engaged with the intermediate gear, wherein the at least one inner lower element is connected to one of the at least two clamping devices; the control element comprising a gear shifting lever connected to the intermediate gear; the gear shifting lever comprising a pressing end protruding from an end surface of the housing, and a connection end connected to the pressing end, wherein the connection end is connected to the intermediate gear; a first positioning tooth being disposed on the connection end, and a second positioning tooth being disposed on the housing; when the pressing end is pressed towards the center of the housing, the first positioning tooth becomes disengaged from the second positioning tooth; and at this time, the gear rack of the at least one inner lower element slides along the intermediate gear; when the pressing end being released, the first positioning tooth becomes engaged with the second positioning tooth, and the gear rack stops sliding while the intermediate gear stops rotating.

12. The vehicle-mounted mobile phone holder according to claim 11, wherein the intermediate gear comprises a body connected to the gear rack, and a shank connected to the body; the gear shifting lever further comprises a hidden spring; a chamber is formed in the shank; a space is likewise formed in the connection end; one end of the hidden spring is accommodated in the chamber of the shank, and the other end of the hidden spring is accommodated in the space of the connection end; meanwhile, the connection end sleeves the shank; when the pressing end is pressed, the hidden spring is in a compressed state; when the pressing end is released, the hidden spring restores to its original shape to push the first positioning tooth to be engaged with the second positioning tooth.

13. The vehicle-mounted mobile phone holder according to claim 11, wherein a vibration-damping element is disposed at a position, corresponding to the at least one inner lower element, of the housing; and the vibration-damping element is in contact with the at least one inner lower element.

* * * * *